US012750719B2

(12) United States Patent
El Ferkouss et al.

(10) Patent No.: US 12,750,719 B2
(45) Date of Patent: Sep. 29, 2026

(54) REGULATORY COMPLIANCE FOR WIDE BANDWIDTH WIFI-RANGING MEASUREMENTS

(71) Applicant: HEWLETT PACKARD ENTERPRISE DEVELOPMENT LP, Spring, TX (US)

(72) Inventors: Omar El Ferkouss, St. Laurent (CA); Andre Beaudin, Montreal (CA)

(73) Assignee: Hewlett Packard Enterprise Development LP, Spring, TX (US)

( * ) Notice: Subject to any disclaimer, the term of this patent is extended or adjusted under 35 U.S.C. 154(b) by 379 days.

(21) Appl. No.: 18/474,551

(22) Filed: Sep. 26, 2023

(65) Prior Publication Data

US 2025/0106676 A1 Mar. 27, 2025

(51) Int. Cl.
*H04W 28/02* (2009.01)
*G01S 5/02* (2010.01)
*H04W 84/12* (2009.01)

(52) U.S. Cl.
CPC ....... *H04W 28/0231* (2013.01); *G01S 5/0215* (2013.01); *H04W 84/12* (2013.01)

(58) Field of Classification Search
CPC . H04W 28/0231; H04W 84/12; H04W 28/02; G01S 5/02; G01S 5/0215
See application file for complete search history.

(56) References Cited

U.S. PATENT DOCUMENTS 11,683,722 B2 6/2023 El Ferkouss et al.
2017/0181178 A1* 6/2017 Gokturk ................ H04W 40/12
2019/0342795 A1* 11/2019 McFarland ........... H04W 24/08
2022/0078727 A1* 3/2022 Chennichetty ...... H04W 56/001

OTHER PUBLICATIONS

Wikipedia, "List of WLAN channels", available online at <https://en.wikipedia.org/w/index.php?title=List_of_WLAN_channels&oldid=1166122235>, Jul. 19, 2023, 15 pages.
ETSI, "5 GHz RLAN; Harmonised Standard covering the essential requirements of article 3.2 of Directive 2014/53/EU", Nov. 2011, 123 pages.
UNII DFS, "Compliance Measurement Procedures for Unlicensed-National Information Infrastructure Devices Operating in The 5250-5350 MHz and 5470-5725 MHz Bands Incorporating Dynamic Frequency Selection", Federal Communications Commission Office of Engineering and Technology Laboratory Division, Apr. 8, 2016, 49 pages.

* cited by examiner

*Primary Examiner* — Tuan H Nguyen
(74) *Attorney, Agent, or Firm* — Dickinson Wright

(57) ABSTRACT

Examples perform regulatory-compliant traffic checks for a wider bandwidth than a WLAN channel an AP is currently operating over before temporarily increasing the WLAN channel to the wider bandwidth to serve Wi-Fi ranging requests with improved precision. An example AP may: (1) while performing non-ranging Wi-Fi operations over a WLAN channel of a first bandwidth, perform a regulatory-compliant traffic check to determine whether a second bandwidth is clear of priority traffic, wherein the second bandwidth is wider than the first bandwidth; (2) responsive to receiving a Wi-Fi ranging request and determining the second bandwidth is clear of priority traffic, modify the WLAN channel from the first bandwidth to the second bandwidth to serve the Wi-Fi ranging request; and (3) upon completed service of the Wi-Fi ranging request, restore the WLAN channel to the first bandwidth for performing non-ranging Wi-Fi operations.

20 Claims, 7 Drawing Sheets

REGULATORY COMPLIANCE FOR WIDE BANDWIDTH WIFI-RANGING MEASUREMENTS

BACKGROUND

A computer network (sometimes referred to as a "network") may comprise a variety of network devices (e.g., access points, controllers, gateways, switches, etc.) which perform various networking operations. For example, a Wireless Local Area Network (WLAN) may comprise a plurality of access points (APs) that perform networking operations such as providing network access, performing authentication, routing network traffic to provide connectivity, etc. Client devices (e.g., laptops, personal computers, smartphones, etc.) connect to network devices to exchange data with a network. Network devices and client devices may be examples of wireless communication devices that exchange wireless communication signals over a network.

The IEEE 802.11 standards provide several distinct radio frequency (RF) ranges (sometimes referred to herein as frequency bands) for use in WLAN communications. Examples of existing frequency bands include the 2.4 GHz frequency band and the 5 GHz frequency band. A 6 GHz frequency band is currently in development. A frequency band may be divided into multiple WLAN channels. The WLAN channels may have various bandwidths (e.g., 20 MHz, 40 MHZ, 80 MHz, or 160 MHz).

Generally, enterprise WLAN deployments use narrower bandwidth WLAN channels (typically 20 MHz or 40 MHz) for operation, particularly in dense environments. These narrower bandwidth WLAN channels can minimize interference, allow spatial reuse, enhance spectrum efficiency, and reduce adverse impact on neighbor AP performance. Using narrower bandwidth WLAN channels can also provide a greater number of WLAN channels and better coverage, particularly in dense enterprise WLAN deployments.

As used herein, a "home channel" of an AP may refer to a WLAN channel over which the AP is configured to perform common enterprise functions (e.g., traffic forwarding, delivering high priority traffic, providing enterprise services, servicing connected client devices, scanning the network, etc.). As alluded to above, in typical enterprise WLAN deployments, home channels for APs are preconfigured to narrow bandwidths (e.g., 20 MHz or 40 MHZ).

BRIEF DESCRIPTION OF THE DRAWINGS

The present disclosure, in accordance with one or more various examples, is described in detail with reference to the following figures. The figures are provided for purposes of illustration only and merely depict examples.

Figure 1:
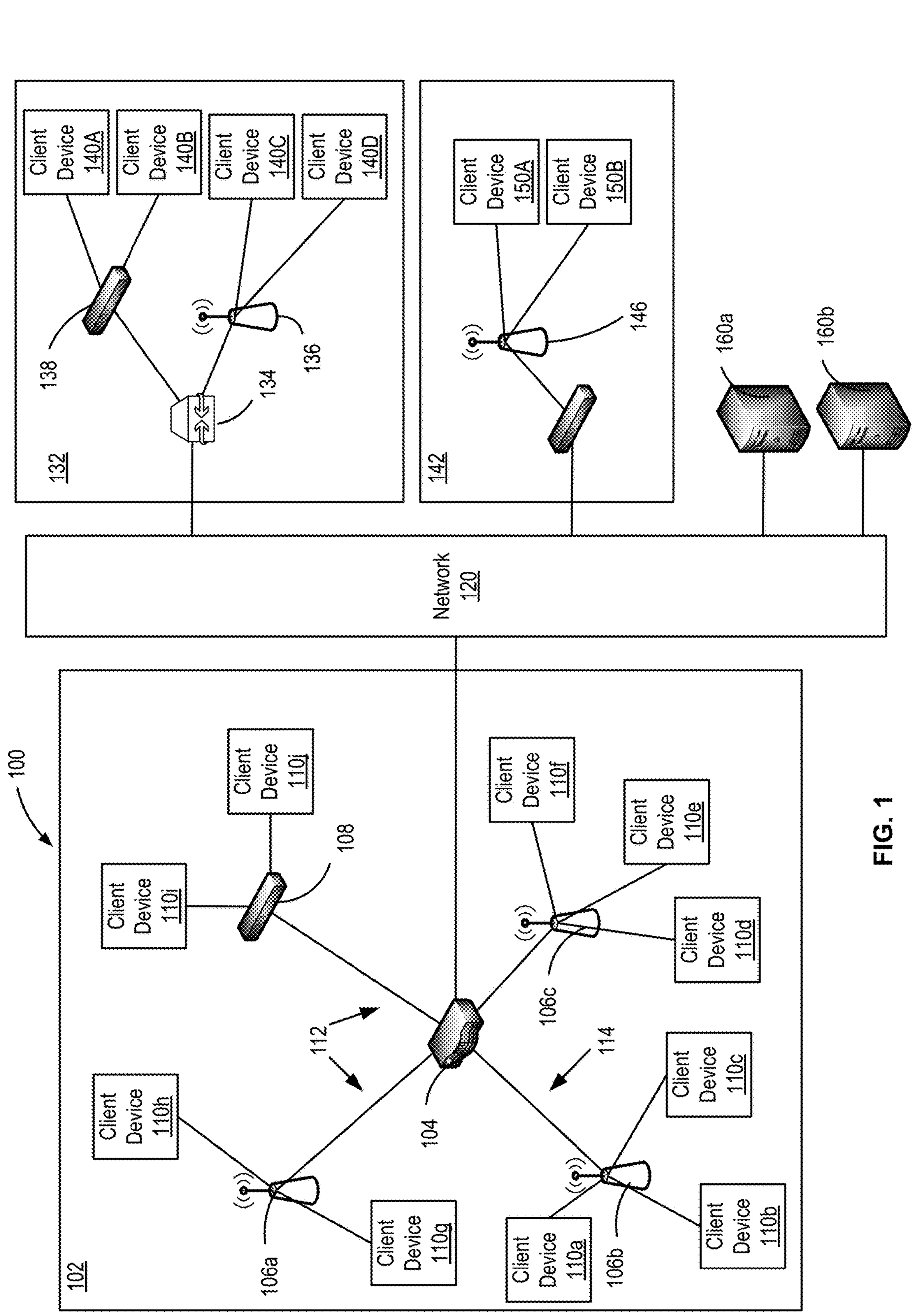
FIG. 1 illustrates an example network deployment within which various examples of the presently disclosed technology may be implemented.

The figures are not exhaustive and do not limit the present disclosure to the precise form disclosed.

DETAILED DESCRIPTION

Wi-Fi ranging operations (e.g., Fine Timing Measurement (FTM) operations) allow wireless communication devices (e.g., client devices and APs) to estimate distance with respect to each other. For example, Wi-Fi ranging operations enable a Wi-Fi ranging initiator (i.e., a wireless communication device, such as a client device or an AP, seeking to localize itself) to determine its distance from Wi-Fi ranging responders (i.e., other wireless communication devices, such as APs, performing Wi-Fi ranging operations with the Wi-Fi initiator) by measuring the travel time of wireless communication signals sent between the Wi-Fi ranging initiator and responder(s). As the Wi-Fi ranging responder(s) typically have known/static locations, the Wi-Fi ranging initiator can estimate its location/position within a network via distance estimates derived from the Wi-Fi ranging operations. Fine Timing Measurement (FTM) positioning techniques are an example of Wi-Fi ranging operations. Consistent with FTM, an FTM initiator (i.e., a wireless communication device, such as a client device or AP, seeking to localize itself via FTM positioning techniques) can send ranging request(s) to initiate FTM session(s) with one or more FTM responders (i.e., other wireless communication devices, such as APs, performing FTM positioning techniques with the FTM initiator). During the FTM sessions, FTM messages may be exchanged between the FTM initiator and FTM responder(s). The FTM initiator (and/or the FTM responder(s)) can utilize the FTM message exchange to determine time of arrival (TOA), round-trip time (RTT), or a time difference of arrival (TDOA) for wireless communication signals carrying the FTM messages. The FTM initiator (and/or the FTM responder(s)) can the utilize the RTT, TOA, and TDOA information to determine distance(s) between the FTM initiator and the FTM responder(s). These distances, in combination with known/static locations of the FTM responder(s), can be used to estimate position/location of the FTM initiator.

An AP allocates computing resources and time slots to serve Wi-Fi ranging requests (i.e., perform Wi-Fi ranging operations). As the AP receives additional Wi-Fi ranging requests, the AP may consume additional computing resources and time slots to serve the Wi-Fi ranging requests. This can increase processing load of the AP, adversely affecting traffic handling performance of the AP. Thus, it can be beneficial to improve balance between use of AP resources devoted to Wi-Fi ranging vs. non-ranging Wi-Fi operations (e.g., providing enterprise services, servicing connected client devices, delivering high priority traffic, scanning the network, etc.). On the other hand, it can also be beneficial to optimally serve Wi-Fi ranging requests to increase precision of position/location measurements.

In general, Wi-Fi ranging operations are more precise when performed over WLAN channels having wider bandwidth (e.g., 80 MHZ, 160 MHZ, etc.). For example, many wireless communication devices can reach under one-meter precision error by performing Wi-Fi ranging operations over 80 MHz WLAN channels. This error can increase dramatically when the Wi-Fi ranging operations are performed over narrower bandwidth WLAN channels (e.g., 20 MHz of 40 MHZ). This can be a problem in enterprise WLAN deployments which typically utilize narrower bandwidth WLAN channels (e.g., 20 MHz or 40 MHz) to optimize Wi-Fi capacity/coverage, minimize interference among neighbor APs, etc.

To better balance the above-described competing interests involved with serving Wi-Fi ranging requests in enterprise WLAN deployments, examples of the presently disclosed technology provide APs (and associated methodologies) that temporarily/selectively increase bandwidth of an AP's home channel in order to serve Wi-Fi ranging requests in a more precise manner. When Wi-Fi ranging requests are not being served (i.e., when an AP is performing non-ranging Wi-Fi operations) the AP's home channel may be restored to the narrower bandwidths preferred in dense, enterprise deployments-thereby optimizing Wi-Fi capacity/coverage, minimizing interference among neighbor APs, etc. Relatedly, the present techniques can also enable the AP to efficiently use the RF spectrum by using different channel bandwidths for performing Wi-Fi ranging and non-ranging Wi-Fi operations (e.g., providing enterprise services, servicing connected client devices, delivering high priority traffic, scanning the network, etc.). Thus, a balanced distribution of RF spectrum and computing resources of the AP may be achieved. Also, because examples increase bandwidth of the AP's home channel to serve Wi-Fi ranging requests—as opposed to switching to a different, wider bandwidth WLAN channel for serving Wi-Fi ranging requests—examples can prevent/reduce loss of air-time or connection loss associated with (unnecessary) WLAN channel switching.

However, communication over certain WLAN channels requires an AP to complete a regulatory-compliant traffic check prior to performing operations in the WLAN channels. The regulatory-compliant traffic check may confirm, for a regulation-specified time interval, that a WLAN channel is clear of traffic that has priority over other wireless communications in the WLAN channel (i.e., "priority traffic"). For example, Dynamic Frequency Selection (DFS) is a channel allocation scheme for Wi-Fi designed to prevent interference with radar communications (i.e., an example of priority traffic for DFS channels) over DFS channels (i.e., WLAN channels in the 5 GHz frequency band dedicated to DFS). Thus, various jurisdictions have DFS-related regulations that require an AP to automatically switch channels/frequencies when radar (e.g., Doppler weather radar) is detected. Relatedly, DFS-related regulations generally require an AP to perform a DFS channel availability check (CAC) that confirms no radar is present in a DFS channel for a regulation-specified time interval (e.g., 60 seconds), before performing operations over the DFS channel. When APs' home channels are DFS channels, existing APs generally perform such DFS CACs for the preconfigured bandwidths of their home channels. For example, an AP operating in an enterprise WLAN deployment utilizing 20 MHz bandwidth DFS channels would perform a DFS CAC for the preconfigured 20 MHz bandwidth of its home (DFS) channel. Here, it should be understood that DFS CACs are just one example of regulatory-compliant traffic checks for determining that no priority traffic is present (e.g., for a regulation-specified time interval) in a WLAN channel before performing Wi-Fi operations over the WLAN channel. For example, the 6 GHz standard may utilize an analogous regulatory-compliant traffic check that confirms no incumbent priority traffic (i.e., a specific example of priority traffic for 6 GHz unlicensed channels) is present in an unlicensed 6 GHz channel (e.g., for a regulation-specified time interval) prior to performing Wi-Fi operations over the 6 GHz unlicensed channel.

But as examples of the presently disclosed technology are designed in appreciation of, the above-described conventional regulatory-compliant traffic check methodology would be insufficient if an AP were to temporarily increase bandwidth of its home channel (e.g., from 20 MHz to 80 MHz) to serve a Wi-Fi ranging request. For example, a DFS CAC performed for the preconfigured 20 MHz bandwidth of an AP's home (DFS) channel may not detect radar present in a wider 80 MHz bandwidth. Moreover, modifying the home channel to the wider bandwidth (e.g., increasing the home channel from 20 MHz to 80 MHZ) and then performing a DFS CAC for the wider bandwidth may cause the AP to operate over the wider bandwidth for longer than necessary while performing the DFS CAC—which in some cases may not even confirm the wider bandwidth is clear of radar. Operating at the wider bandwidth longer than necessary may adversely affect performance of the AP in a dense enterprise WLAN deployment where narrower bandwidth operation is preferable. Relatedly, time taken for the AP to complete the bandwidth increase, perform the DFS CAC at the wider bandwidth (which again, may exceed 60 seconds), and then serve the Wi-Fi ranging request may exceed a beacon interval of the AP. Here, potentially missing transmission of a beacon frame can negatively impact performance of the AP's enterprise function responsibilities.

Against this backdrop, an AP consistent with the presently disclosed technology performs regulatory-compliant traffic checks for a wider bandwidth (e.g., 80 MHz) than its current/pre-configured home channel bandwidth (e.g., 20 MHZ) before temporarily increasing the home channel (e.g., from 20 MHz to 80 MHz) to the wider bandwidth to serve a Wi-Fi ranging request with improved precision. For example, the AP may: (1) while performing non-ranging Wi-Fi operations over a WLAN channel of a first bandwidth, perform a regulatory-compliance traffic check (e.g., a DFS CAC) to determine whether a second bandwidth is clear of priority traffic (e.g., radar), wherein the second bandwidth is wider than the first bandwidth (in various examples, a dedicated antenna of the AP may perform the regulatory-compliance traffic check repetitively); (2) responsive to receiving a Wi-Fi ranging request (e.g., a ranging request to initiate an FTM session) and determining the second bandwidth is clear of priority traffic (e.g., clear of radar), modify the WLAN channel from the first bandwidth to the second bandwidth to serve the Wi-Fi ranging request (e.g., perform an FTM session); and (3) upon completed service of the Wi-Fi ranging request, restore the WLAN channel to the first bandwidth for performing non-ranging Wi-Fi operations. Accordingly, the AP can serve Wi-Fi ranging requests with improved precision over WLAN channels (e.g., DFS channels) that require a regulatory-compliance traffic check to be performed before transmitting over the WLAN channels.

As alluded to above, by performing regulatory-compliant traffic checks for a wider bandwidth (e.g., 80 MHZ) than an AP's current/preconfigured home channel bandwidth (e.g., 20 MHZ) before temporarily increasing the home channel (e.g., from 20 MHz to 80 MHz) to the wider bandwidth, examples of the presently disclosed technology can reduce the amount of time the AP operates over the wider bandwidth-thereby improving performance for non-ranging Wi-Fi operations (i.e., enterprise) functions of the AP. Reducing the amount of time the AP operates over the wider bandwidth performing Wi-Fi ranging-related operations can also reduce a likelihood that the AP misses a beacon frame— which can also improve performance of non-ranging Wi-Fi operations (i.e., enterprise) functions of the AP. Relatedly, an AP of the presently disclosed technology capable of splitting chains/antennas can dedicate a single chain/antenna to repetitively perform the regulatory-compliant traffic check for the wider bandwidth—allowing the remaining chains/antennas of the AP to devote their resources to enterprise functions. Alternatively, an AP of the presently disclosed technology with dedicated radio capabilities can dedicate a single radio to repetitively perform the regulatory-compliant traffic check for the wider bandwidth—allowing the remaining/primary radios of the AP to devote their resources to enterprise functions.

To be clear, modifying bandwidth of an AP's home channel in order to perform Wi-Fi ranging operations and then restoring the home channel to its original/preconfigured bandwidth upon completion of the Wi-Fi ranging operations differs from existing methodologies in many ways. For example, utilizing conventional Wi-Fi ranging techniques, an AP receiving a Wi-Fi ranging request would simply serve the Wi-Fi ranging request using the preconfigured bandwidth of its home channel. In other words, the AP would not modify its home channel bandwidth or switch WLAN channels before servicing the Wi-Fi ranging request. For example, a conventional AP in an enterprise WLAN deployment utilizing narrow bandwidth channels (e.g., 20 MHz or 40 MHz) would serve a Wi-Fi ranging request using the preconfigured narrow bandwidth of its home channel. This may result in high precision errors in positioning of Wi-Fi ranging initiators in the enterprise WLAN deployment. By contrast, an AP of the presently disclosed technology can serve Wi-Fi ranging requests with improved precision by temporarily/selectively increasing bandwidth of the AP's home channel (e.g., from 20 MHZ to 80 MHz) in order to serve Wi-Fi ranging requests. Again, this can be performed in a regulatory-compliant manner that minimizes time spent operating over the wider bandwidth by performing regulatory-compliant traffic checks for the wider bandwidth before temporarily increasing the home channel to the wider bandwidth.

Before describing embodiments of the disclosed systems and methods in detail, it is useful to describe an example network installation with which these systems and methods might be implemented in various applications. FIG. 1 illustrates one example of a network configuration 100 that may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

The primary site 102 may include a primary network (e.g., a WLAN network), which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site may include multiple controllers and/or multiple communication points with network 120. In some embodiments, the controller 104 communicates with the network 120 through a router (not illustrated). In other embodiments, the controller 104 provides router functionality to the devices in the primary site 102.

The controller 104 may be operable to configure and manage network devices, such as at the primary site 102, and may also manage network devices at the remote sites 132, 142. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless Access Points (APs) 106 *a-c*. Switches 108 and wireless APs 106 *a-c* provide network connectivity to various client devices 110 *a-j*. Using a connection to a switch 108 or AP 106 *a-c*, a client device 110 *a-j* may access network resources, including other devices on the (primary site 102) network and the network 120.

Examples of client devices may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IoT) devices, and the like. Client devices may also be referred to as stations (STA).

Within the primary site 102, a switch 108 is included as one example of a point of access to the network established in primary site 102 for wired client devices 110 *i-j*. Client devices 110 *i-j* may connect to the switch 108 and through the switch 108, may be able to access other devices within the network configuration 100. The client devices 110 *i-j* may also be able to access the network 120, through the switch 108. The client devices 110 *i-j* may communicate with the switch 108 over a wired 112 connection. In the illustrated example, the switch 108 communicates with the controller 104 over a wired 112 connection, though this connection may also be wireless.

Wireless APs 106 *a-c* are included as another example of a point of access to the network established in primary site 102 for client devices 110 *a-h*. The APs 106 *a-c* may control network access of the client devices 110 *a-h* and may authenticate the client devices 110 *a-h* for connecting to the APs and through the APs, to other devices within the network configuration 100. Each of APs 106 *a-c* may be a combination of hardware, software, and/or firmware that is configured to provide wireless network connectivity to wireless client devices 110 *a-h*. In the illustrated example, APs 106 *a-c* can be managed and configured by the controller 104. APs 106 *a-c* communicate with the controller 104 and the network over connections 112, which may be either wired or wireless interfaces.

The network configuration 100 may include one or more remote sites 132. A remote site 132 may be located in a different physical or geographical location from the primary site 102. In some cases, the remote site 132 may be in the same geographical location, or possibly the same building, as the primary site 102, but lacks a direct connection to the network located within the primary site 102. Instead, remote site 132 may utilize a connection over a different network, e.g., network 120. A remote site 132 such as the one illustrated in FIG. 1 may be, for example, a satellite office, another floor or suite in a building, and so on. The remote site 132 may include a gateway device 134 for communicating with the network 120. A gateway device 134 may be a router, a digital-to-analog modem, a cable modem, a Digital Subscriber Line (DSL) modem, or some other network device configured to communicate to the network 120. The remote site 132 may also include a switch 138 and/or AP 136 in communication with the gateway device 134 over either wired or wireless connections. The switch 138 and AP 136 provide connectivity to the network for various client devices 140 *a-d*.

In various embodiments, the remote site 132 may be in direct communication with primary site 102, such that client devices 140 *a-d* at the remote site 132 access the network resources at the primary site 102 as if these clients devices 140 *a-d* were located at the primary site 102. In such embodiments, the remote site 132 is managed by the controller 104 at the primary site 102, and the controller 104 provides the necessary connectivity, security, and accessibility that enable the remote site 132's communication with the primary site 102. Once connected to the primary site 102, the remote site 132 may function as a part of a private network provided by the primary site 102.

In various embodiments, the network configuration 100 may include one or more smaller remote sites 142, comprising only a gateway device 144 for communicating with the network 120 and a wireless AP 146, by which various client devices 150 *a-b* access the network 120. Such a remote site 142 may represent, for example, an individual employee's home or a temporary remote office. The remote site 142 may also be in communication with the primary site 102, such that the client devices 150 *a-b* at remote site 142 access network resources at the primary site 102 as if these client devices 150 *a-b* were located at the primary site 102. The remote site 142 may be managed by the controller 104 at the primary site 102 to make this transparency possible. Once connected to the primary site 102, the remote site 142 may function as a part of a private network provided by the primary site 102.

The network 120 may be a public or private network, such as the Internet, or other communication network to allow connectivity among the various sites 102, 130 to 142 as well as access to servers 160 *a-b*. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities. The network 120 may include various content servers 160 *a-b*. Content servers 160 *a-b* may include various providers of multimedia downloadable and/or streaming content, including audio, video, graphical, and/or text content, or any combination thereof. Examples of content servers 160 *a-b* include, for example, web servers, streaming radio and video providers, and cable and satellite television providers. The client devices 110 *a-j*, 140 *a-d*, 150 *a-b* may request and access the multimedia content provided by the content servers 160 *a-b*.

Figure 2A:
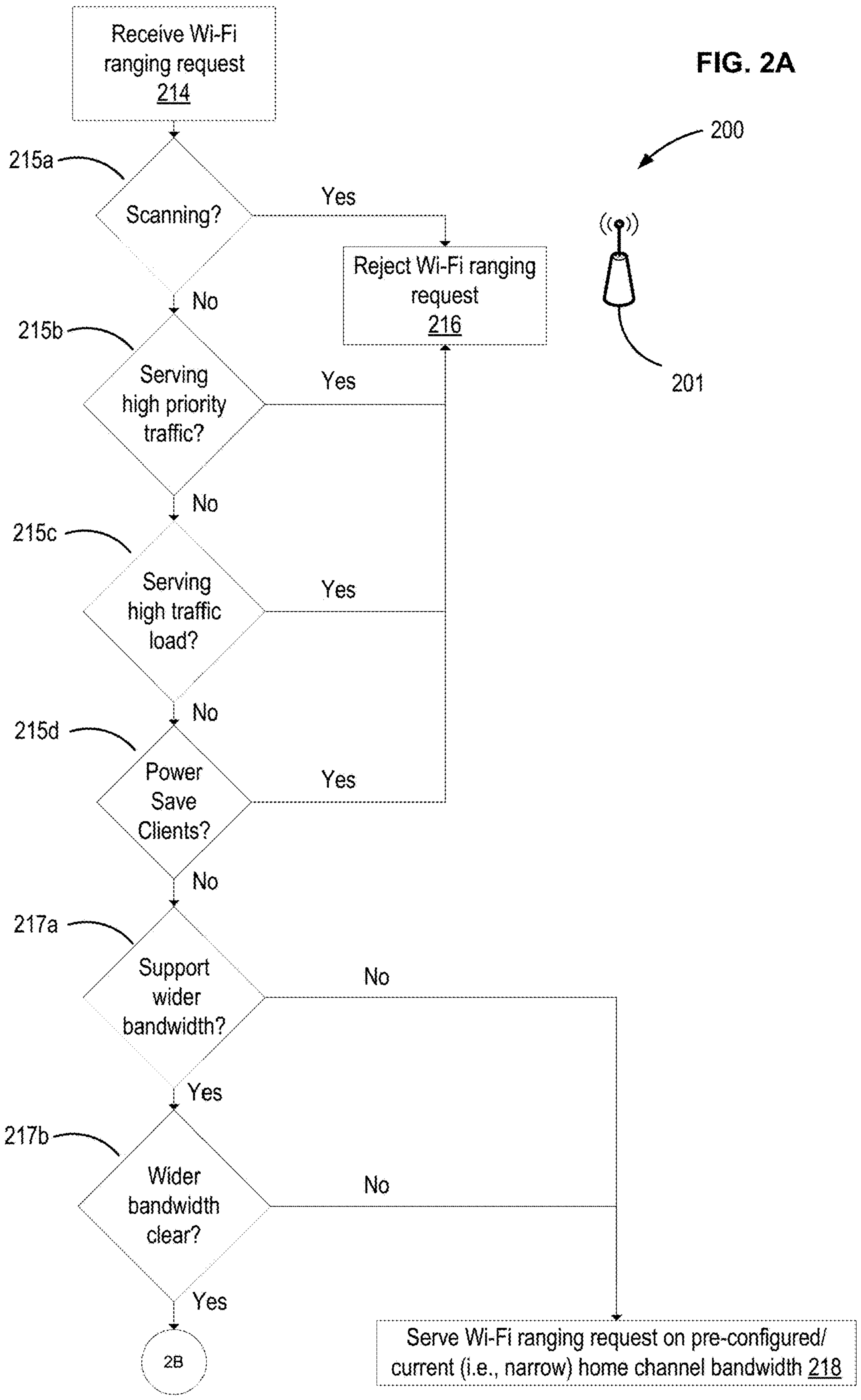
FIGS. 2A-2B illustrate an example method for performing regulatory-compliant Wi-Fi ranging operations with improved precision, in accordance with various examples of the presently disclosed technology.
Figure 2B:
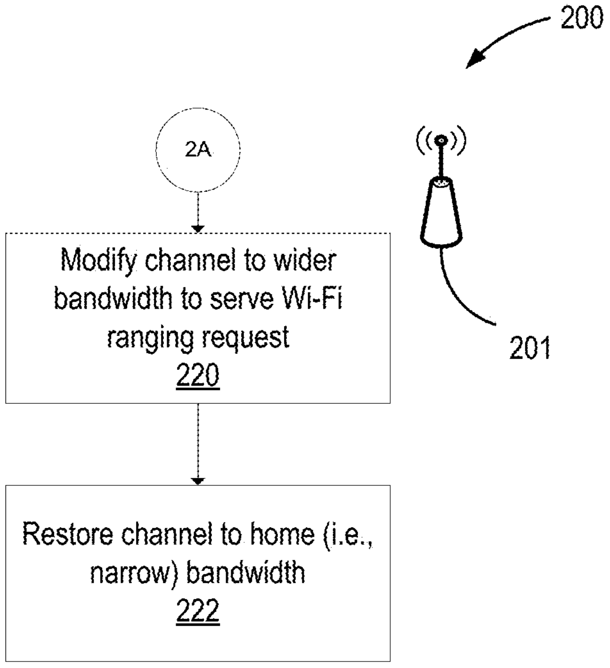

FIGS. 2A-2B illustrate an example method for performing regulatory-compliant Wi-Fi ranging operations with improved precision, in accordance with various examples of the presently disclosed technology. The method may be executed by an AP 201 within an enterprise WLAN deployment 200. However, it should be understood that in other examples AP 201 may comprise various types of wireless communication devices including a network device (e.g., an AP, a switch, a router, a gateway, etc.) or a client device (e.g., a personal computer, laptop, smartphone, etc.). For example, the method of FIGS. 2A-2B can be performed mutatis mutandis by a client device. In general, the method can be implemented by processing resource(s) or computing device(s) through any suitable hardware, a non-transitory machine readable medium, or combination thereof. In an example, the method may be performed by computer-readable instructions, which include instructions stored on a medium and executable by a processing resource, such as a hardware processor of a computing device/component. It may be understood that processes involved in the method can be executed based on instructions stored in a non-transitory computer-readable medium. The non-transitory computer-readable medium may include, for example, digital memories, magnetic storage media, such as a magnetic disks and magnetic tapes, hard drives, or optically readable digital data storage media.

As alluded to above, AP 201 may be part of an enterprise WLAN deployment 200. Enterprise WLAN deployments typically use narrower bandwidth channels (typically 20 MHz or 40 MHZ) for operation, particularly in dense environments. These narrower bandwidth channels can minimize interference, allow spatial reuse, enhance spectrum efficiency, and reduce adverse impact on neighbor AP performance. Using narrower bandwidth channels can also provide a greater number of channels and better coverage, particularly in dense enterprise WLAN deployments.

However, Wi-Fi ranging operations are more precise when performed over WLAN channels having wider bandwidth (e.g., 80 MHz, 160 MHZ, etc.). For example, many wireless communication devices can reach under one-meter precision error by performing Wi-Fi ranging operations over 80 MHz WLAN channels. This error can increase dramatically when the Wi-Fi ranging operations are performed over narrower bandwidth WLAN channels (e.g., 20 MHz of 40 MHZ). This can be a problem in enterprise WLAN deployments which typically utilize narrower bandwidth WLAN channels (e.g., 20 MHz or 40 MHz) to optimize Wi-Fi capacity/coverage, minimize interference among neighbor APs, etc.

To better balance the above-described competing interests involved with serving Wi-Fi ranging requests in enterprise WLAN deployments, examples of the presently disclosed technology provide APs (e.g., AP 201) that temporarily/selectively increase bandwidth of an AP's home channel in order to serve Wi-Fi ranging requests in a more precise manner. When Wi-Fi ranging requests are not being served (i.e., when an AP is performing non-ranging Wi-Fi operations) the AP's home channel may be restored to the narrower bandwidths preferred in dense, enterprise deployments-thereby optimizing Wi-Fi capacity/coverage, minimizing interference among neighbor APs, etc. Relatedly, the present techniques can also enable the AP to efficiently use the RF spectrum by using different channel bandwidths for performing Wi-Fi ranging and non-ranging Wi-Fi operations functions (e.g., providing enterprise services, servicing connected client devices, delivering high priority traffic, scanning the network, etc.). Thus, a balanced distribution of the RF spectrum and computing resources of the AP for may be achieved. Also, because examples increase bandwidth of the AP's home channel to serve Wi-Fi ranging requests—as opposed to switching to a different, wider bandwidth WLAN channel for serving Wi-Fi ranging requests—examples can prevent/reduce loss of air-time or connection loss associated with (unnecessary) WLAN channel switching.

However, communication over certain WLAN channels requires an AP to complete a regulatory-compliant traffic check prior to performing operations in the WLAN channels. The regulatory-compliant traffic check may confirm that a channel is clear of priority traffic (i.e., traffic in the channel that has priority over other wireless communications) for a regulation-specified time interval. For example, Dynamic Frequency Selection (DFS) refers to a channel allocation scheme which facilitates use of WLAN channels generally reserved for radar. Thus, by using DFS channels, under-serviced frequencies can be utilized which can increase the number of available channels. DFS also enables an AP to detect radar signals and switch their operating frequency to prevent interference. Since, DFS channels are generally used for radars, different radio communication regulatory agencies, such as the Federal Communications Commission (FCC), impose several conditions and guidelines for use of DFS channels. For example, DFS-related regulations generally require an AP to perform a DFS channel availability check (CAC) that confirms no radar is present in a DFS channel for a regulation-specified time interval (e.g., 60 seconds), before performing operations over the DFS channel (an example of a DFS CAC is described in greater detail in conjunction with FIG. 3). When APs' home channels are DFS channels, APs conventionally perform DFS CACs for the preconfigured bandwidths of their home channels. For example, an AP operating in an enterprise WLAN deployment utilizing 20 MHz bandwidth DFS channels would perform a DFS CAC for the preconfigured 20 MHz bandwidth of its home (DFS) channel. Analogous regulatory-compliant traffic checks may be performed for non-DFS channels as well. For example, an analogous regulatory-compliant traffic check may be performed to confirm that no incumbent priority traffic ("incumbent priority traffic" is a term sometimes used to describe traffic that has priority in 6 GHz unlicensed channels) is present in a 6 GHz unlicensed channel (i.e., an unlicensed channel in the 6 GHZ frequency band) prior to transmitting over the 6 GHz unlicensed channel.

But as examples of the presently disclosed technology are designed in appreciation of, the above-described conventional regulatory-compliant traffic check methodology would be insufficient if an AP were to temporarily increase bandwidth of its home channel (e.g., from 20 MHz to 80 MHz) to serve a Wi-Fi ranging request. For example, a DFS CAC performed for the preconfigured 20 MHz bandwidth of an AP's home (DFS) channel may not detect radar present in a wider 80 MHz bandwidth. Moreover, modifying the home channel to the wider bandwidth (e.g., increasing the home channel from 20 MHz to 80 MHZ) and then performing a DFS CAC for the wider bandwidth may cause the AP to operate over the wider bandwidth for longer than necessary while performing the DFS CAC—which in some cases may not even confirm the wider bandwidth is clear of radar. Operating at the wider bandwidth longer than necessary may adversely affect performance of the AP in a dense enterprise WLAN deployment where narrower bandwidth operation is preferable. Relatedly, time taken for the AP to complete the bandwidth increase, perform the DFS CAC at the wider bandwidth (which again, may exceed 60 seconds), and then serve the Wi-Fi ranging request may exceed a beacon interval of the AP. Here, potentially missing transmission of a beacon frame can negatively impact performance of the AP's enterprise function responsibilities.

Against this backdrop, an AP consistent with the presently disclosed technology (e.g., AP 201) performs regulatory-compliant traffic checks for a wider bandwidth (e.g., 80 MHZ) than its current/pre-configured home channel bandwidth (e.g., 20 MHz) before temporarily increasing the home channel (e.g., from 20 MHz to 80 MHZ) to the wider bandwidth to serve a Wi-Fi ranging request with improved precision. For example, the AP may: (1) while performing non-ranging Wi-Fi operations over a WLAN channel of a first bandwidth, perform a regulatory-compliant traffic check (e.g., a DFS CAC or an analogous regulatory-compliant traffic check for 6 GHz networks) to determine whether a second bandwidth is clear of priority traffic (e.g., radar for DFS channels or incumbent priority traffic for 6 GHz unlicensed channels), wherein the second bandwidth is wider than the first bandwidth (in various examples, a dedicated antenna of the AP may perform the regulatory-compliant traffic check repetitively); (2) responsive to receiving a Wi-Fi ranging request (e.g., a ranging request to initiate an FTM session) and determining the second bandwidth is clear of priority traffic (e.g., clear of radar or "incumbent priority traffic"), modify the WLAN channel from the first bandwidth to the second bandwidth to serve the Wi-Fi ranging request (e.g., perform an FTM session); and (3) upon completed service of the Wi-Fi ranging request, restore the WLAN channel to the first bandwidth for performing non-ranging Wi-Fi operations. Accordingly, the AP can serve Wi-Fi ranging requests with improved precision over WLAN channels (e.g., DFS channels or 6 GHz unlicensed channels) that require a regulatory-compliance traffic check to be performed before transmitting over the WLAN channels.

As alluded to above, by performing regulatory-compliant traffic checks for a wider bandwidth (e.g., 80 MHZ) than an AP's current/preconfigured home channel bandwidth (e.g., 20 MHZ) before temporarily increasing the home channel (e.g., from 20 MHz to 80 MHz) to the wider bandwidth, examples of the presently disclosed technology can reduce the amount of time the AP operates over the wider bandwidth-thereby improving performance for non-ranging Wi-Fi operations (i.e., enterprise) functions of the AP.

FIGS. 2A-2B describe an example methodology consistent with the disclosure above.

Referring now to FIG. 2A, AP 201 can receive a Wi-Fi ranging request at operation 214.

A Wi-Fi ranging request—sent from a Wi-Fi ranging initiator to a Wi-Fi ranging responder—may comprise a request to perform Wi-Fi ranging operations. As alluded to above, Wi-Fi ranging operations allow wireless communication devices (e.g., client devices and network devices) to estimate distance with respect to each other. Namely, Wi-Fi ranging operations enable a Wi-Fi ranging initiator (i.e., a wireless communication device, such as a client device or AP, seeking to localize itself by sending the Wi-Fi ranging request) to determine its distance from Wi-Fi ranging responders (i.e., other wireless communication devices performing Wi-Fi ranging operations with the Wi-Fi ranging initiator) by measuring the travel time of wireless communication signals sent between the Wi-Fi ranging initiator and responder(s). As the Wi-Fi ranging responder(s) (e.g., APs of a WLAN) typically have known/static locations, the Wi-Fi ranging initiator can estimate its location/position within a network via distance estimates resulting from the Wi-Fi ranging operations.

Fine Timing Measurement (FTM) positioning techniques are an example of Wi-Fi ranging operations. Consistent with FTM, an FTM initiator (i.e., a wireless communication device, such as a client device or AP, seeking to localize itself via FTM positioning techniques) can send ranging request(s) to initiate FTM session(s) to one or more FTM responders (i.e., other wireless communication devices, such as APs, performing FTM positioning techniques with the FTM initiator). During the FTM sessions, FTM messages may be exchanged between the FTM initiator and FTM responders. The FTM initiator (and/or the FTM responder(s)) can utilize the FTM message exchange to determine time of arrival (TOA), round-trip time (RTT), or a time difference of arrival (TDOA) for wireless communication signals carrying the FTM messages. The FTM initiator (and/or the FTM responder(s)) can the utilize the RTT, TOA, and TDOA information to determine position/location of the FTM initiator based on known position of the FTM responder(s). For example, an FTM initiator (e.g., a client device or another AP) may attempt to establish an FTM session with an FTM responder (e.g., an AP) by sending —to the FTM responder—a ranging request to initiate an FTM session. The FTM initiator may be previously connected to the FTM responder prior to sending the ranging request. Based on the ranging request, the FTM responder may determine a burst duration indicative of a time period for performing the FTM session. An FTM session generally occurs via burst transmissions. Burst transmission may refer to broadcast of a relatively high-bandwidth transmission over a short period. Burst transmission may include intermittent asynchronous transmission of a specific amount of data. Burst transmission can be intermittent at a regular or an irregular rate. Time duration for executing one FTM session may be referred to as the burst duration or simply FTM burst. There may be one or more FTM-based messages exchanged between an FTM initiator and FTM responder in the FTM burst.

Referring again to FIG. 2A, in response to receiving the Wi-Fi ranging request, AP 201 can consider various factors to determine whether to reject the Wi-Fi ranging request (see e.g., operation 216). It should be understood that the order of these determinations depicted via blocks 215*a*-215*d* may be different in various examples. Relatedly, certain examples may not require making one or more of the depicted determinations.

Referring again to FIG. 2A, at block 215*a*, AP 201 can determine whether AP 201 is performing a channel scan or if AP 201 is scheduled to perform a channel scan. Channel scans may be performed based on WLAN channel types, priorities and, WLAN channel groups. During channel scanning, AP 201 may visit each channel of enterprise WLAN deployment 200 sequentially and the primary WLAN channel may be rotated after each visit. In some examples, while AP 201 is performing a channel scan and the Wi-Fi ranging request is received via a WLAN channel which AP 201 is scanning, AP 201 may reject the Wi-Fi ranging request, as shown at operation 216. In certain examples, if AP 201 is scheduled to initiate a channel scan and the Wi-Fi ranging request is received via AP 201's home channel, AP 201 may also reject the Wi-Fi ranging request. By rejecting Wi-Fi ranging requests during channel scans, non-ranging Wi-Fi operations functions of AP 201 may be prioritized thereby reducing adverse impact on network performance for AP 201.

At block 215*b*, AP 201 can determine whether it is serving high priority traffic. In some examples, the high priority traffic may include voice/video, VoIP traffic, online gaming, media streaming services, etc. In certain examples, high priority traffic may be classified based on a differentiated services code point (DSCP) present in an Internet Protocol (IP) packet header. In other examples, the high priority traffic may be sensitive traffic which the operator has an expectation to deliver on time. Traffic management schemes may be configured in such a way that the quality of service of these selected uses is guaranteed, or at least prioritized over other classes of traffic. In some examples, high priority traffic served by AP 201 may be identified. The high priority traffic may be identified based on identifiers present in the packets transmitted via AP 201. AP 201 may classify traffic as high priority based on a number of factors including port number, protocol, byte frequencies, packet sizes, etc. Based on the above factors, AP 201 may implement traffic management schemes or policies to classify the traffic and serve traffic based on its classification. In some examples, network traffic can be classified as sensitive traffic and best effort traffic. Examples of sensitive traffic may include VoIP, online gaming, video conferencing, and web browsing. Traffic management schemes can be configured such that the quality of service (QOS) of these selected uses is guaranteed, or at least prioritized over other classes of traffic. Best effort traffic may comprise other kinds of non-detrimental traffic. This may be traffic that a service provider deems is not sensitive to QoS parameters (such as jitter, packet loss, latency). Examples of best effort traffic may include peer-to-peer and email applications. Traffic management schemes may be configured such that resources of AP 201 are assigned to the best-effort traffic after sensitive traffic is served in priority. Thus, the high priority traffic, in this example, may include sensitive traffic. In some examples, network traffic served by AP 201 may be classified as high priority or best effort using service differentiation techniques. For instance, a DSCP which is a packet header value in an IP packet can be used to request (for example) high priority or best effort delivery for network traffic.

In certain examples, in response to determining that AP 201 is serving high priority traffic, AP 201 may reject the Wi-Fi ranging request at operation 216. By rejecting the Wi-Fi ranging request while servicing high priority traffic, high priority traffic handling is given higher priority than servicing of Wi-Fi ranging request requests, thereby balancing distribution of AP 201's resources among Wi-Fi ranging and non-Wi-Fi ranging functions.

At block 215*c*, AP 201 can determine whether its traffic load is higher than a traffic load threshold. In some examples, the traffic load threshold may be about 10 Mega Bytes Per Second (MBPS). In certain examples, in response to determining that AP 201's traffic load is higher than the traffic load threshold, AP 201 may reject the Wi-Fi ranging request at operation 216, thereby preventing (or reducing the likelihood of) processing overload for AP 201.

At block 215*d*, AP 201 can determine whether it has buffered data for associated client devices in a power saving (PS) state (i.e., whether AP 201 is serving "power save" client devices). The PS state of a client device may indicate a low power mode of the client device, where some of the components/peripherals, such as display units, hard disks, are tuned off and some of the components, such as Random Access Memory (RAM), processing units, etc., are continued to run with reduced power. In some examples, AP 201 may use Traffic Indication Map (TIM) bitmap to indicate to a client device in a PS state that AP 201 has buffered data waiting for it. AP 201 can periodically send the TIM bitmap in its beacons as an information element. The TIM bitmap may include a multitude of bits, where each bit represents an Association ID (AID) of a client device. Thus, a portion of the TIM bitmap representing client device for which AP 201 has buffered data can be transmitted with the beacons. Using the TIM bitmap sent in a beacon, AP 201 can determine it has buffered data waiting to be transmitted to associated client devices in the PS state.

In certain examples, in response to determining that AP 201 has buffered data for associated client devices in a PS state, AP 201 can reject the Wi-Fi ranging request at operation 216. This is because power save client devices can be very sensitive to latency. Thus, it can be beneficial to send power save client devices their traffic before serving the Wi-Fi ranging request. Relatedly, draining power save client devices queues prior to performing Wi-Fi ranging operations can improve performance for the Wi-Fi ranging operations.

At block 217*a*, AP 201 can determine whether the Wi-Fi ranging initiator (i.e., the wireless communication device that sent the Wi-Fi ranging request) supports (i.e., is operable in) a channel having a wider bandwidth than AP 201's current home channel bandwidth (i.e., the home channel bandwidth over which the Wi-Fi ranging request was received). In some examples, AP 201 can determine whether the Wi-Fi ranging initiator supports the wider bandwidth based on information in the "Format and Bandwidth" field of the Wi-Fi ranging request sent by the Wi-Fi ranging initiator.

As alluded to above, operating in enterprise WLAN deployment 200, AP 201 will typically have a narrower preconfigured home channel bandwidth (e.g., 20 MHz or 40 MHZ). However, in accordance with examples of the presently disclosed technology, AP 201 may temporarily increase bandwidth of its home channel (e.g., to 80 MHz or 160 MHz) in order to serve Wi-Fi ranging requests with improved precision. Accordingly, if the Wi-Fi ranging initiator does not support the wider bandwidth channel, AP 201 may instead serve the Wi-Fi ranging request over AP 201's preconfigured/current (i.e., narrow) home channel bandwidth at operation 218.

Figure 3:
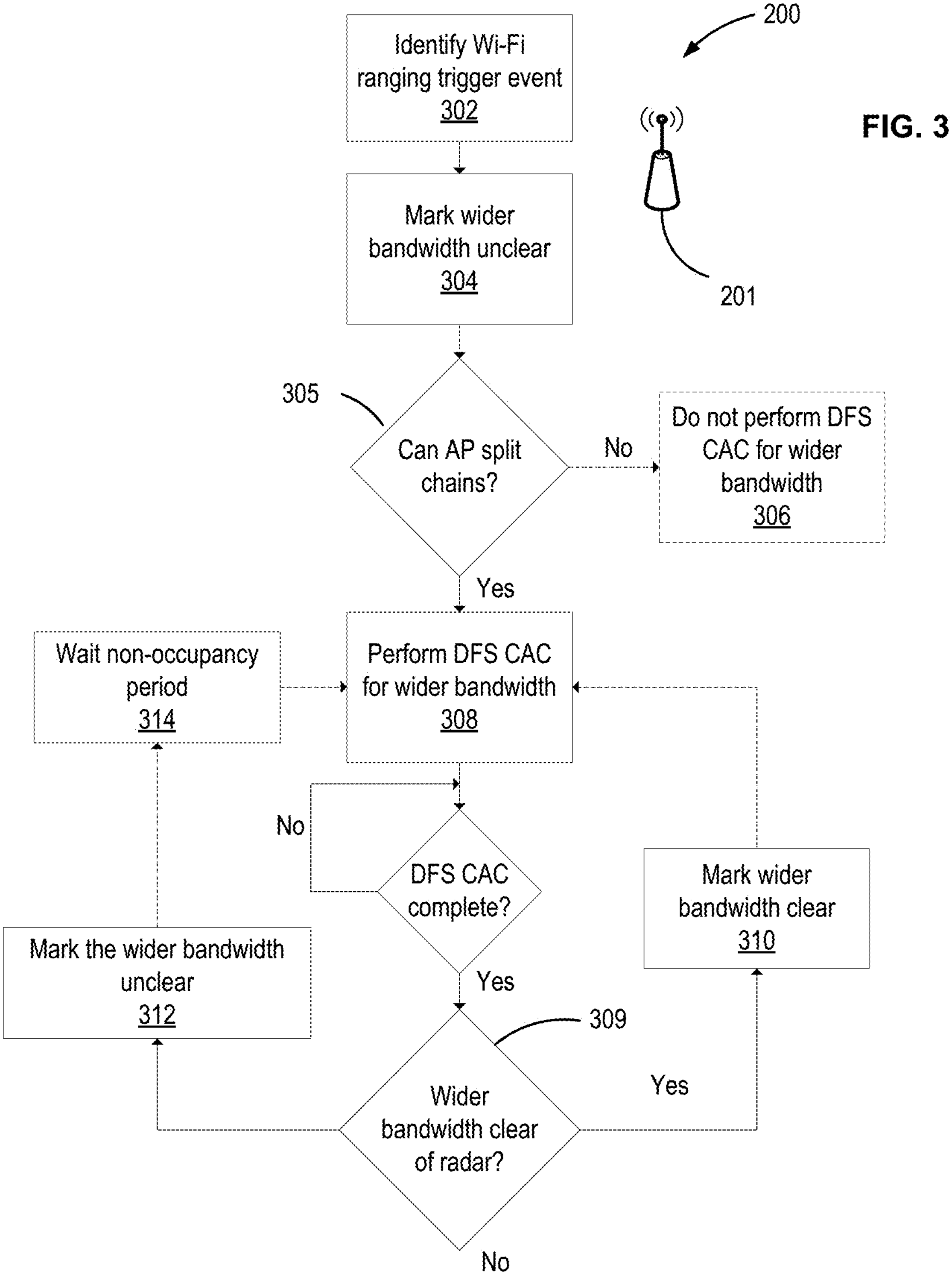
FIG. 3 illustrates an example method for performing a regulatory-compliant traffic check, in accordance with various examples of the presently disclosed technology.

At block 217*b*, AP 201 determines whether the wider bandwidth channel is clear of priority traffic. AP 201 can utilize various types of regulatory-compliant traffic checks to make such a determination (e.g., DFS CACs for DFS channels, an analogous regulatory-compliant traffic check for 6 GHz unlicensed channels, etc.). FIG. 3 describes an illustrative example of a regulatory-compliant traffic check in greater detail.

If AP 201 determines that the wider bandwidth is not clear of priority traffic, AP 201 may instead serve the Wi-Fi ranging request over AP 201's preconfigured/current (i.e., narrow) home channel bandwidth at operation 218.

If however, AP 201 determines that the wider bandwidth is clear of priority traffic, AP 201 can serve the Wi-Fi ranging request over the wider bandwidth in the manner described in conjunction with FIG. 2B.

As depicted in FIG. 2B, at operation 220, in response to determining the wider bandwidth is clear of priority traffic, AP 201 can modify its home channel to the wider bandwidth in order to serve the Wi-Fi ranging request. In various examples, AP 201 can modify the bandwidth by using the "Format and Bandwidth" field in a Wi-Fi ranging response sent by AP 201.

At operation 222, upon completed service of the Wi-Fi ranging request, AP 201 can restore its home channel to the preconfigured/original (i.e, narrower) bandwidth for performing non-ranging Wi-Fi operations-thereby improving performance for non-ranging Wi-Fi (i.e., enterprise) operations of AP 201.

FIG. 3 illustrates an example method for performing a regulatory-compliant traffic check, in accordance with various examples of the presently disclosed technology. Like the example method of FIGS. 2A-2B, the example method of FIG. 3 may be executed by AP 201 within enterprise WLAN deployment 200.

Before describing FIG. 3 in greater detail, it should be understood that FIG. 3 merely depicts an example of a regulatory-compliant traffic check that may be leveraged by examples of the presently disclosed technology. In other words, while the specific example of FIG. 3 may refer to DFS CACs (i.e., a type of regulatory-compliant traffic check performed for DFS channels), the presently disclosed methodology may be extended to analogous regulatory-compliant traffic checks, such as for 6 GHz unlicensed channels.

Referring now to FIG. 3, AP 201 can perform operation 302 to identify a Wi-Fi ranging trigger event. A Wi-Fi ranging trigger event may comprise a network event that indicates AP 201 has received, or is likely to imminently receive, a Wi-Fi ranging request. Accordingly, examples of Wi-Fi ranging trigger events may comprise AP 201 receiving a Wi-Fi ranging request from another wireless communication device (i.e., a Wi-Fi ranging initiator, such as a client device or another AP), or a neighbor AP receiving a Wi-Fi ranging request. Accordingly, identifying the Wi-Fi ranging trigger event may comprise AP 201 receiving a Wi-Fi ranging request, or detecting that a neighbor AP has received a Wi-Fi ranging request.

Upon identifying a Wi-Fi ranging trigger event, AP 201 can perform operation 304 to mark, as unclear, a wider bandwidth than the preconfigured/current bandwidth of AP 201's home channel. For example, if AP 201's preconfigured/current home channel bandwidth is 20 MHZ, AP 201 can mark a bandwidth of 80 MHz (encompassing AP 201's preconfigured/current 20 MHz home channel bandwidth) as unclear. Initially marking the wider bandwidth as unclear may be a default-type operation that complies with DFS-related regulations. For example, DFS-related regulations may prevent AP 201 from marking the wider bandwidth channel as clear until AP 201 has completed a regulatory-compliant DFS CAC check for the wider bandwidth (see e.g., operation 308)—and confirmed that no radar (i.e., an example of priority traffic) is present in the wider bandwidth for a DFS regulation-specified time interval. For example, regulations in many jurisdictions require an AP to complete a DFS CAC check to confirm no radar is present in a DFS channel for a regulation-specified time interval (e.g., 60 seconds)—before transmitting in the DFS channel. As alluded to above, existing technologies will generally only perform regulatory-compliant traffic checks (e.g., DFS CACs) for the preconfigured/current bandwidths of their home channels—which in the case of AP 201 will be a narrower bandwidth channel (e.g., 20 MHZ). However, because examples of the presently disclosed technology temporarily increase/modify bandwidth of an AP's home channel to a wider bandwidth to serve Wi-Fi ranging requests, performing a regulatory-compliant DFS CAC check for the wider bandwidth may be required in some cases (e.g., where the AP's home channel is a DFS channel) before serving the Wi-Fi ranging requests over the wider bandwidths.

As alluded to above (and as depicted at block 305), in various examples AP 201 may be able to split chains/antennas. In such a case, AP 201 may dedicate one chain/ antenna to repetitively (and in some cases, constantly) perform DFS CACs for the wider bandwidth-allowing the remaining chains/antennas of AP 201 to devote their resources to enterprise functions. In other words, the dedicated chain/antenna may perform DFS CACs for the wider bandwidth regardless of whether a Wi-Fi ranging trigger event is detected. In some examples, the dedicated chain/antenna may be re-devoted to enterprise functions in certain situations (e.g., when AP 201 is serving high priority traffic, when AP 201 is serving a high traffic load, when no Wi-Fi ranging trigger event has been identified for over a threshold time interval, etc.). Re-devoting the dedicated chain/antenna to enterprise functions in select situations can improve performance for enterprise functions, conserve power/resources, etc.

As depicted at block 305, in certain examples if AP 201 is unable to split chains/antennas, AP 201 may not perform DFS CACs for the wider bandwidth (see e.g., operation 306). However, in other examples AP 201 may perform DFS CACs for the wider bandwidth without splitting chains/antennas. For instance, AP 201 may be an AP with dedicated radio capabilities. Accordingly, AP 201 may devote a dedicated radio to repetitively (and in some cases, constantly) perform DFS CACs for the wider bandwidth. In still further examples (e.g., where AP 201 is unable to split chains and/or dedicate a radio for performing DFS CACs), AP 201 may only perform DFS CACs for the wider bandwidth in response to identifying a Wi-Fi ranging event, or at repetitive but discrete intervals. Accordingly, AP 201 can better balance devoting resources to both Wi-Fi ranging operations and non-ranging Wi-Fi operations (i.e., enterprise) operations.

As depicted, AP 201 can perform DFS CACs for the wider bandwidth at operation 308. As alluded to above, this may comprise confirming that no radar (i.e., an example of priority traffic for DFS channels) is present in the wider bandwidth for a regulation-specified time interval. If radar is detected in the wider bandwidth during the regulation-specified time interval, AP 201 can mark the wider bandwidth as clear (see e.g., block 309 and operation 310). By contrast, if radar is detected in the wider bandwidth during the DFS regulation-specified time interval, AP 201 can mark the wider bandwidth as unclear (see e.g., block 309 and operation 312). As depicted, AP 201 can perform DFS CACs in a repetitive manner (i.e., the process may not terminate upon marking the wider bandwidth as clear/unclear). However, as depicted at operation 314, AP 201 may be required to wait until a regulation-specified non-occupancy period (e.g., 30 minutes) has expired before performing another DFS CAC after marking the wider bandwidth as unclear of radar.

As alluded to above, regulatory-compliant traffic checks performed for DFS channels may be referred to as DFS CACs. DFS-related regulations generally require an AP to perform a DFS CAC that confirms no radar is present in a DFS channel for a regulation-specified time interval (e.g., 60 seconds), before performing operations over the DFS channel. One type of DFS CAC is a Zero Wait DFS operation. Conventionally, wireless communication devices switch to a new DFS channel, and then perform a DFS CAC for the new DFS channel before performing operations over the new DFS channel. By contrast, Zero Wait DFS allows a wireless communication device to perform a DFS CAC for a new channel—while still operating over a different channel. Accordingly, once the Zero Wait DFS operation is complete for the new channel, the wireless communication device can switch to the new DFS channel and perform operations over the new DFS channel with no down-time. It should be understood that examples of the presently disclosed technology utilize Zero Wait DFS operations differently—namely to perform a DFS CAC for a wider bandwidth than a DFS channel's current bandwidth—while still operating over the narrower/current bandwidth of the DFS channel. Accordingly, once the Zero Wait DFS operation is complete for the wider bandwidth, examples can modify the DFS channel to the wider bandwidth and perform operations over the wider bandwidth with no down-time.

Figure 4:
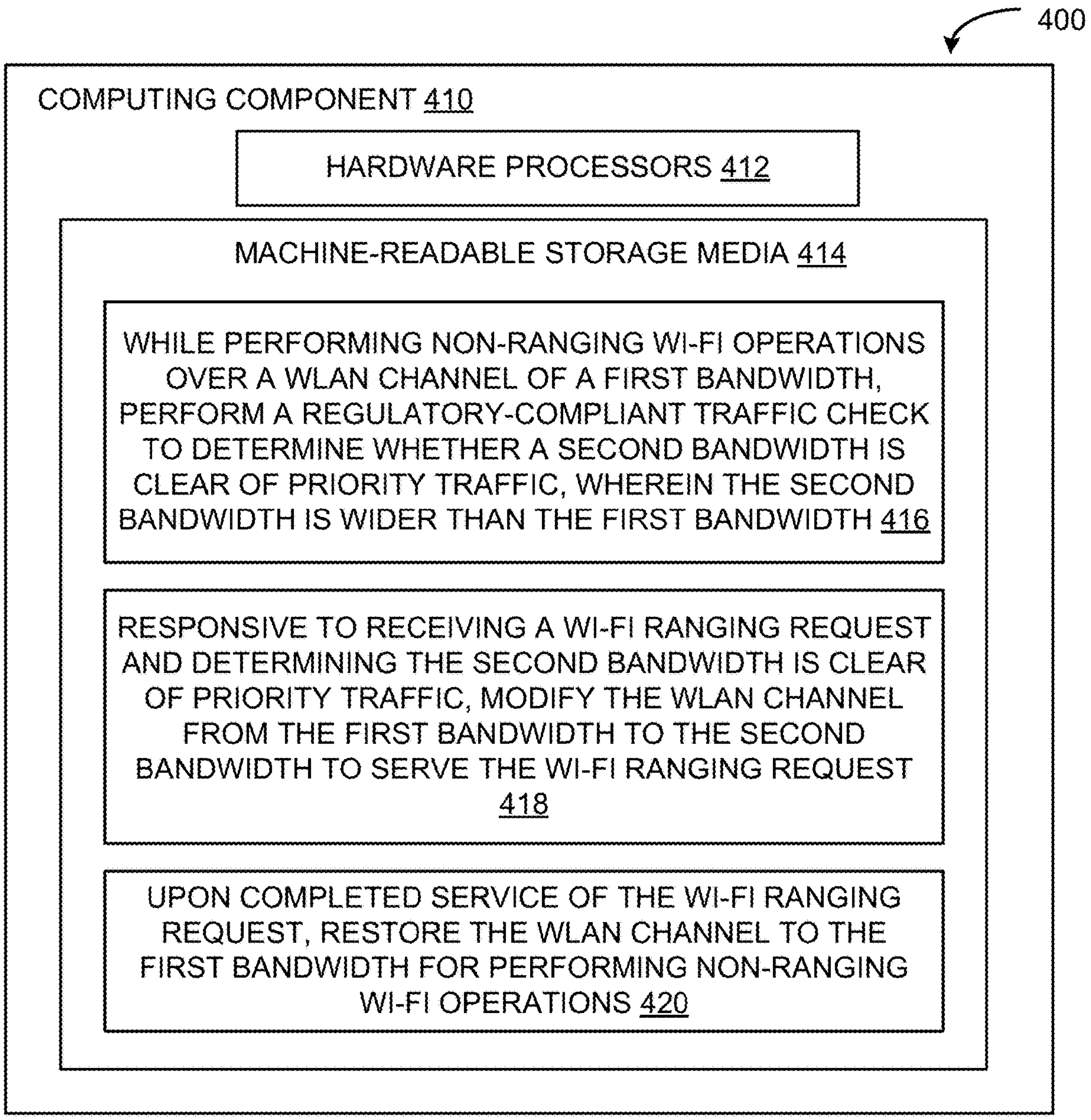
FIG. 4 depicts an example computing system that can be used to perform regulatory-compliant Wi-Fi ranging operations with improved precision, in accordance with various examples of the presently disclosed technology.

FIG. 4 depicts an example computing system 400 that can be used to perform regulatory-compliant Wi-Fi ranging operations with improved precision, in accordance with various examples of the presently disclosed technology. In various examples, computing system 400 may function as a network device, as referred to in examples described herein. Examples of the network device may include APs, layer 3 switches, and routers. In some examples, computing system 400 may function as a client device, such as a computer, a smartphone, etc., connecting to the network device.

Referring now to FIG. 4, computing component 410 may be, for example, a server computer, a controller, or any other similar computing component capable of processing data. In the example implementation of FIG. 4, the computing component 410 includes a hardware processor 412, and machine-readable storage medium for 414.

Hardware processor 412 may be one or more central processing units (CPUs), semiconductor-based microprocessors, and/or other hardware devices suitable for retrieval and execution of instructions stored in machine-readable storage medium 414. Hardware processor 412 may fetch, decode, and execute instructions, such as instructions 416-420, to control processes or operations for burst preloading for available bandwidth estimation. As an alternative or in addition to retrieving and executing instructions, hardware processor 412 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 414, may be any electronic, magnetic, optical, or other physical storage device that contains or stores executable instructions. Thus, machine-readable storage medium 414 may be, for example, Random Access Memory (RAM), non-volatile RAM (NVRAM), an Electrically Erasable Programmable Read-Only Memory (EEPROM), a storage device, an optical disc, and the like. In some examples, machine-readable storage medium 414 may be a non-transitory storage medium, where the term "non-transitory" does not encompass transitory propagating indicators. As described in detail below, machine-readable storage medium 414 may be encoded with executable instructions, for example, instructions 416-420. Further, although the instructions shown in FIG. 4 are in an order, the shown order is not the only order in which the instructions may be executed. Any instruction may be performed in any order, at any time, may be performed repeatedly, and/or may be performed by any suitable device or devices.

As depicted, hardware processor 412 executes instruction 416 to, while performing non-ranging Wi-Fi operations over a Wireless Local Area Network (WLAN) channel of a first bandwidth (e.g., 20 MHz or 40 MHZ), perform a regulatory-compliant traffic check to determine whether a second bandwidth (e.g., 80 MHz or 160 MHz) is clear of priority traffic (i.e., traffic that has priority over other wireless communications in the channel), wherein the second bandwidth is wider than the first bandwidth. As alluded to above, where computing system 400 functions as an AP, the WLAN channel may be the AP's home channel.

In various examples, the WLAN channel can be a Dynamic Frequency Selection (DFS) WLAN channel. Similarly, determining the second bandwidth is clear of priority traffic may comprise determining the second bandwidth is clear of radar traffic for a DFS regulation-specified time interval (e.g., 60 seconds). In certain of these examples, performing the regulatory-compliant traffic check for the second bandwidth may comprise performing a Zero Wait DFS operation for the second bandwidth. Relatedly, determining the second bandwidth is clear of radar traffic for the DFS regulation-specified time interval may comprise completing the Zero Wait DFS operation after the DFS regulation-specified time interval.

It should be understood that in other examples the WLAN channel may comprise a non-DFS channel. For example, the WLAN channel may comprise an unlicensed channel in the 6 GHz frequency band. In these examples, the priority traffic in the 6 GHz unlicensed channel may be referred to as "incumbent priority traffic"—consistent with the 6 GHz standard.

In some examples (e.g., where computing system 400 comprises an AP), hardware processor 412 can perform the regulatory-compliant traffic check for the second bandwidth repetitively using a dedicated antenna/chain of computing system 400. Relatedly, in certain examples (e.g., where computing system 400 comprises an AP), hardware processor 412 may execute further instructions to: (1) determine that computing system 400 can split antennas/chains; and (2) perform the channel availability check for the second bandwidth using a dedicated antenna of computing system 400. However, in other examples (e.g., where computing system 400 comprises an AP with dedicated radio capabilities), hardware processor 412 may utilize a dedicated radio for performing the regulatory-compliant traffic check.

As alluded to above, in certain examples hardware processor 412 may perform the regulatory-compliant traffic check for the second bandwidth in response to a Wi-Fi ranging trigger event, such as detecting a neighbor AP has received a Wi-Fi ranging request.

Hardware processor 412 executes instruction 418 to, responsive to receiving a Wi-Fi ranging request and determining the second bandwidth is clear of priority traffic, modify the WLAN channel from the first bandwidth to the second bandwidth to serve the Wi-Fi ranging request.

In some examples, the Wi-Fi ranging request may be received from a client device. In other examples, the Wi-Fi ranging request may be received from a network device, such as a neighbor AP.

As alluded to above, in certain examples the Wi-Fi ranging request may comprise a ranging request to initiate a Fine Timing Measurement (FTM) session. In these examples, hardware processor 412 can modify the WLAN channel from the first bandwidth to the second bandwidth to perform the FTM session. However, in other examples the Wi-Fi ranging request may be a different type of Wi-Fi ranging request (e.g., a Wi-Fi ranging request utilized in 6 GHz networks).

In some examples (e.g., where computing system 400 comprises an AP), modifying the WLAN channel from the first bandwidth to the second bandwidth to serve the Wi-Fi ranging request may be further responsive to determining at least one of the following conditions are satisfied: (1) computing system 400 is not performing a channel scan and is not scheduled to perform a channel scan; (2) computing system 400 is not serving traffic pre-categorized as high priority traffic; (3) computing system 400 is serving traffic load below a threshold level; and (4) computing system 400 is not serving power save client devices. Said differently, the instructions may cause hardware processor 412 to reject the Wi-Fi ranging request and not modify the WLAN channel to the second bandwidth, responsive to determining at least one of the following conditions are satisfied: (1) computing system 400 is performing a channel scan or is scheduled to perform a channel scan; (2) computing system 400 is serving traffic pre-categorized as high priority traffic; (3) computing system 400 is serving traffic load above a threshold level; and (4) computing system 400 is serving power save client devices.

In some examples, the instructions may cause hardware process or 412 to serve the Wi-Fi ranging request while the WLAN channel is at the first bandwidth, responsive to determining the second bandwidth is not clear of priority traffic but the first bandwidth is clear of priority traffic.

As depicted, hardware processor 412 executes instruction 420 to, upon completed service of the Wi-Fi ranging request, restore the WLAN channel to the first bandwidth for performing non-ranging Wi-Fi operations. As alluded to above, examples of non-ranging Wi-Fi operations may include traffic forwarding, delivering high priority traffic, providing enterprise services, servicing connected client devices, performing channel scans, etc.

Figure 5:
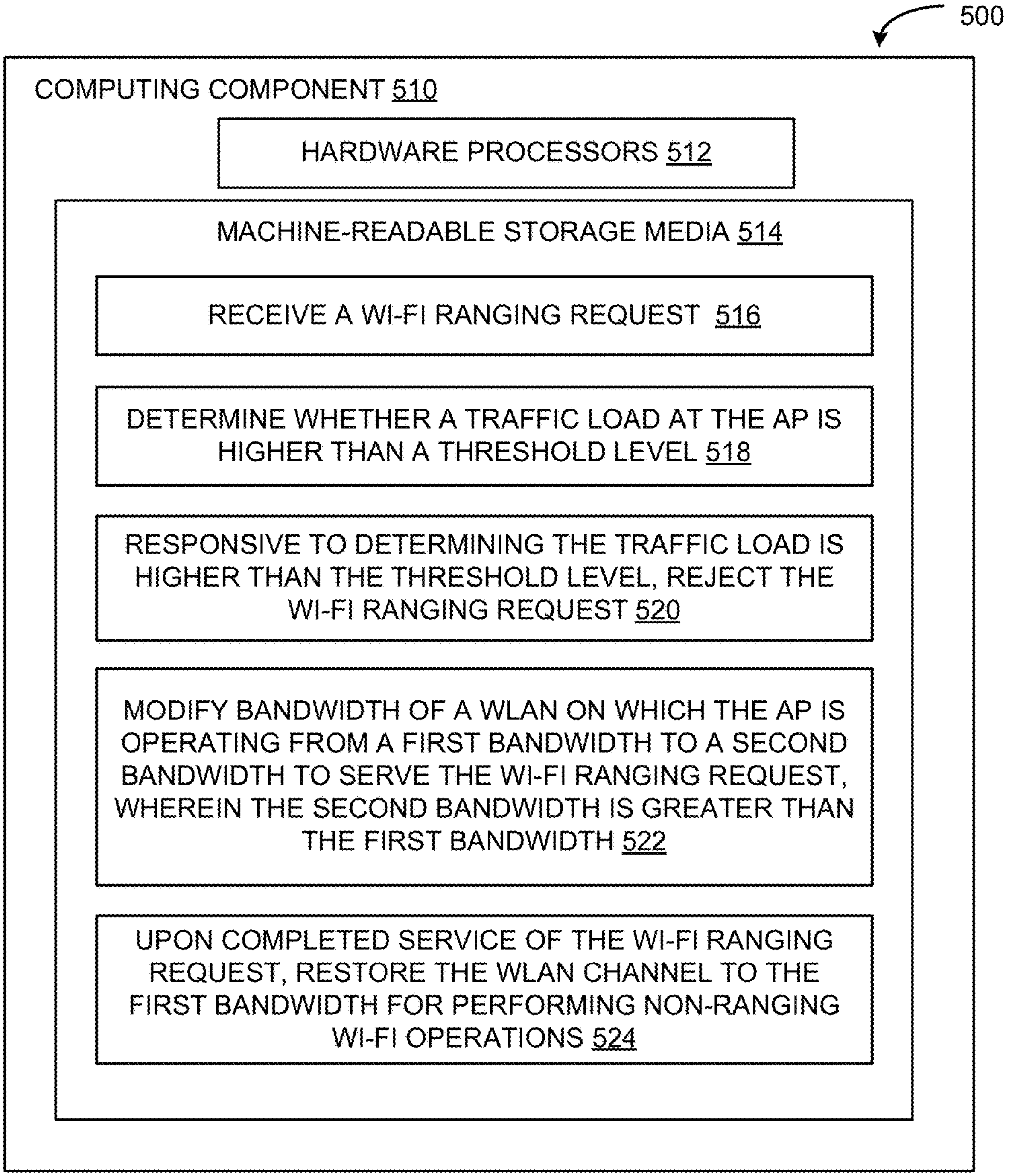
FIG. 5 depicts an example computing system that can be used to perform Wi-Fi ranging operations with improved precision, in accordance with various examples of the presently disclosed technology.

FIG. 5 depicts an example computing system 500 that can be used to perform Wi-Fi ranging operations with improved precision, in accordance with various examples of the presently disclosed technology. In this specific example, computing system 500 may not need to perform a regulatory-compliant traffic check prior to serving a Wi-Fi ranging request over a wider bandwidth. For example, this may be the case where computing system 500's home channel is a non-DFS 5 GHz channel.

As alluded to above, computing system 500 may function as a network device, as referred to in embodiments described herein. Examples of the network device may include APs, layer 3 switches, and routers. In some examples, computing system 500 may function as a client device, such as a computer, a smartphone, etc., connecting to the network device.

Referring now to FIG. 5, computing component 510 may be, for example, a server computer, a controller, or any other similar computing component capable of processing data. In the example implementation of FIG. 5, the computing component 510 includes a hardware processor 512, and machine-readable storage medium for 514.

Hardware processor 512 may be one or more central processing units (CPUs), semiconductor-based microprocessors, and/or other hardware devices suitable for retrieval and execution of instructions stored in machine-readable storage medium 514. Hardware processor 512 may fetch, decode, and execute instructions, such as instructions 516-524, to control processes or operations for burst preloading for available bandwidth estimation. As an alternative or in addition to retrieving and executing instructions, hardware processor 512 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 514, may be any electronic, magnetic, optical, or other physical storage device that contains or stores executable instructions. Thus, machine-readable storage medium 514 may be, for example, Random Access Memory (RAM), non-volatile RAM (NVRAM), an Electrically Erasable Programmable Read-Only Memory (EEPROM), a storage device, an optical disc, and the like. In some examples, machine-readable storage medium 514 may be a non-transitory storage medium, where the term "non-transitory" does not encompass transitory propagating indicators. As described in detail below, machine-readable storage medium 514 may be encoded with executable instructions, for example, instructions 516-524. Further, although the instructions shown in FIG. 5 are in an order, the shown order is not the only order in which the instructions may be executed. Any instruction may be performed in any order, at any time, may be performed repeatedly, and/or may be performed by any suitable device or devices.

As depicted, hardware processor 512 executes instruction 516 to receive a Wi-Fi ranging request. In some examples, the Wi-Fi ranging request may comprise a ranging request to initiate an FTM session, although this need be the case. For example the Wi-Fi ranging request may be a Wi-Fi ranging request for 6 GHz networks.

Where the Wi-Fi ranging request is a ranging request to initiate an FTM session, the FTM session may include an exchange of multiple message frames between a Wi-Fi ranging initiator and computing system 500. In some examples, the Wi-Fi ranging initiator may be an AP or a client device, such as a laptop, desktop, smartphone, etc. Again, computing system 500 (e.g., an AP) may be a Wi-Fi ranging responder. In some examples, the Wi-Fi ranging initiator may attempt to establish an FTM session with computing system 500 to determine a distance between the Wi-Fi ranging initiator and computing system 500. In certain examples, the Wi-Fi ranging initiator may be previously connected with computing system 500 (e.g., an AP) prior to sending the Wi-Fi ranging request. Based on the Wi-Fi ranging request, hardware processor 512 may determine a burst duration indicative of a time period for performing the FTM session. A FTM session generally occurs as burst transmissions. Burst transmission may comprise a broadcast of a relatively high-bandwidth transmission over a short period. Burst transmission may include intermittent asynchronous transmission of a specific amount of data. Burst transmission can be intermittent at a regular or an irregular rate. The time duration for executing one FTM session may be referred to as the burst duration or simply FTM burst. There may be one or more FTM-based messages exchanged between the Wi-Fi initiator and computing system 500 in the FTM burst.

Hardware processor 512 executes instruction 518 to determine whether a traffic load at computing system 500 (e.g., an AP) is higher than a threshold level. Hardware processor 512 can execute instruction 518 in accordance with the methodologies described in conjunction with FIGS. 2A-2B, 3, and 4 above. In certain examples, hardware processor 512 may execute instruction 518 in response to receiving the Wi-Fi ranging request.

Hardware processor 512 executes instruction 520 to, responsive to determining the traffic load is higher than the threshold level, reject the Wi-Fi ranging request. Hardware processor 512 can execute instruction 520 in accordance with the methodologies described in conjunction with FIGS. 2A-2B, 3, and 4 above.

Hardware processor 512 executes instruction 522 to, modify bandwidth of a Wireless Local Area Network (WLAN) channel on which computing system 500 (e.g., an AP) is operating from a first bandwidth (e.g., 20 MHz or 40 MHz) to a second bandwidth (e.g., 80 MHz or 160 MHz) to serve the Wi-Fi ranging request, wherein the second bandwidth is greater than the first bandwidth. As alluded to above, in various examples (e.g., where computing system 500 is an AP), the WLAN channel may be a home channel of computing system 500. In some examples, hardware processor 512 may modify bandwidth of the WLAN channel by using the "Format and Bandwidth" field in an FTM response sent by computing system 500.

In some examples, prior to modifying the bandwidth of the WLAN channel to the second bandwidth to serve the Wi-Fi ranging request, hardware processor 512 can queue non-ranging Wi-Fi traffic such as video, voice, audio, online media streaming, online gaming, etc. In certain of these examples, the non-ranging Wi-Fi traffic may be buffered in a queue of computing system 500 and may be ready for transmission once the WLAN channel is restored back to its previous bandwidth (i.e. the first bandwidth).

Hardware processor 512 executes instruction 522 to, upon completed service of the Wi-Fi ranging request, restore the WLAN channel to the first bandwidth for performing non-ranging Wi-Fi operations. As alluded to above, examples of non-ranging Wi-Fi operations may include traffic forwarding, delivering high priority traffic, providing enterprise services, servicing connected client devices, performing channel scans, etc.

Figure 6:
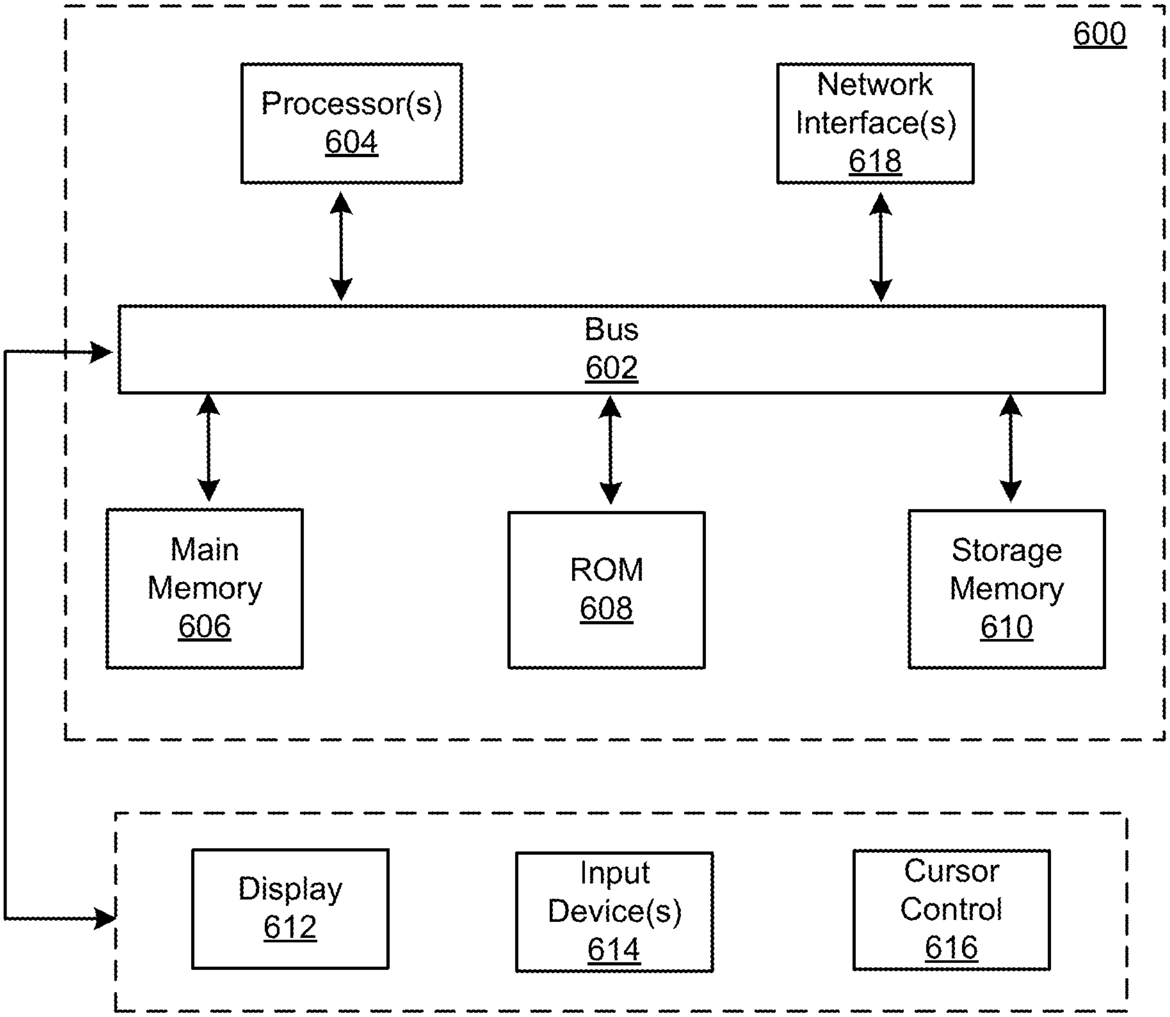
FIG. 6 depicts a block diagram of an example computer system in which various of the examples described herein may be implemented.

FIG. 6 depicts a block diagram of an example computer system 600 in which various of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a liquid crystal display (LCD) (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

The computer system 600 also includes a communication interface 618 coupled to bus 602. Network interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, network interface 618 may be a local area network (LAN) card to provide a data communication connection to a compatible LAN (or WAN component to communicated with a WAN). Wireless links may also be implemented. In any such implementation, network interface 618 sends and receives electrical, electromagnetic or optical indicators that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical indicators that carry digital data streams. The indicators through the various networks and the indicators on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAS, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 600.

As used herein, the term “or” may be construed in either an inclusive or exclusive sense. Moreover, the description of resources, operations, or structures in the singular shall not be read to exclude the plural. Conditional language, such as, among others, “can,” “could,” “might,” or “may,” unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as “conventional,” “traditional,” “normal,” “standard,” “known,” and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as “one or more,” “at least,” “but not limited to” or other like phrases in some instances shall not be read to mean that the narrower case is intended or required in instances where such broadening phrases may be absent.

What is claimed is:

1. An access point (AP) comprising:
a processor; and
a memory coupled to the processor, the memory storing instructions executable by the processor to:
while performing non-ranging Wi-Fi operations over a Wireless Local Area Network (WLAN) channel of a first bandwidth, perform a regulatory-compliant traffic check to determine whether a second bandwidth is clear of priority traffic, wherein the second bandwidth is wider than the first bandwidth, wherein the WLAN channel is a Dynamic Frequency Selection (DFS) WLAN channel,
responsive to receiving a Wi-Fi ranging request and determining the second bandwidth is clear of priority traffic, modify the WLAN channel from the first bandwidth to the second bandwidth to serve the Wi-Fi ranging request, wherein the Wi-Fi ranging request comprises a ranging request to initiate a Fine Timing Measurement (FTM) session, and wherein determining the second bandwidth is clear of priority traffic comprises determining the second bandwidth is clear of radar traffic for a DFS regulation-specified time interval, and
upon completed service of the Wi-Fi ranging request, restore the WLAN channel to the first bandwidth for performing non-ranging Wi-Fi operations.

2. The AP of claim 1, wherein:
performing the regulatory-compliant traffic check for the second bandwidth comprises performing a Zero Wait DFS operation for the second bandwidth; and
determining the second bandwidth is clear of radar traffic for the DFS regulation-specified time interval comprises completing the Zero Wait DFS operation after the DFS regulation-specified time interval.

3. The AP of claim 1, wherein the regulatory-compliant traffic check for the second bandwidth is performed repetitively by a dedicated antenna of the AP.

4. The AP of claim 1, wherein the regulatory-compliant traffic check for the second bandwidth is performed in response to detecting a neighbor AP has received a Wi-Fi ranging request.

5. The AP of claim 1, wherein the Wi-Fi ranging request is received from a client device.

6. The AP of claim 1, wherein the instructions are further executable by the processor to:
determine the AP can split antennas;
perform the regulatory-compliant traffic check for the second bandwidth using a dedicated antenna of the AP; and
in response to determining the second bandwidth is clear of priority traffic, mark the second bandwidth as clear of priority traffic.

7. The AP of claim 1, wherein modifying the WLAN channel from the first bandwidth to the second bandwidth to serve the Wi-Fi ranging request is also responsive to determining at least one of the following conditions are satisfied:
the AP is not performing a channel scan and is not scheduled to perform a channel scan;
the AP is not serving traffic pre-categorized as high priority traffic;
the AP is serving traffic load below a threshold level; and
the AP is not serving power save client devices.

8. The AP of claim 1, wherein the instructions cause the processor to reject the Wi-Fi ranging request and not modify the WLAN channel to the second bandwidth, responsive to determining at least one of the following conditions are satisfied:
the AP is performing a channel scan or is scheduled to perform a channel scan;
the AP is serving traffic pre-categorized as high priority traffic;
the AP is serving traffic load above a threshold level; and
the AP is serving power save client devices.

9. The AP of claim 1, wherein the instructions cause the processor to:
serve the Wi-Fi ranging request while the WLAN channel is at the first bandwidth, responsive to determining the second bandwidth is not clear of priority traffic but the first bandwidth is clear of priority traffic.

10. The AP of claim 1, wherein the WLAN channel is a home channel of the AP.

11. The AP of claim 1, wherein the WLAN channel is a home channel, and wherein modifying the WLAN channel from the first bandwidth to the second bandwidth comprises increasing bandwidth of the home channel to the second bandwidth without switching to a different WLAN channel, and wherein restoring the WLAN channel to the first bandwidth comprises restoring the home channel to the first bandwidth.

12. A non-transitory computer-readable medium comprising computer-readable instructions, the computer-readable instructions when executed by a processor, cause the processor to:

while performing non-Fine Timing Measurement (FTM) operations over a Dynamic Frequency Selection (DFS) Wireless Local Area Network (WLAN) channel of a first bandwidth, perform a DFS channel availability check (CAC) to determine whether a second bandwidth is clear of radar traffic, wherein the second bandwidth is wider than the first bandwidth;

responsive to receiving a ranging request to initiate an FTM session and determining the second bandwidth is clear of radar traffic, modify the DFS WLAN channel from the first bandwidth to the second bandwidth to perform the FTM session; and upon completed performance of the FTM session, restore the DFS WLAN channel to the first bandwidth for performing non-FTM operations.

13. The non-transitory computer-readable medium of claim 12, wherein:

determining the second bandwidth is clear of radar traffic comprises determining the second bandwidth is clear of radar traffic for a DFS regulation-specified time interval.

14. The non-transitory computer-readable medium of claim 13, wherein:

performing the DFS CAC for the second bandwidth comprises performing a Zero Wait DFS operation for the second bandwidth; and determining the second bandwidth is clear of radar traffic for the DFS regulation-specified time interval comprises completing the Zero Wait DFS operation after the DFS regulation-specified time interval.

15. The non-transitory computer-readable medium of claim 12, wherein:

the non-transitory computer-readable medium is implemented on an access point (AP); and the DFS CAC for the second bandwidth is performed repetitively by a dedicated antenna of the AP.

16. The non-transitory computer-readable medium of claim 12, wherein the DFS CAC for the second bandwidth is performed in response to detecting a neighbor AP has received a Wi-Fi ranging request.

17. The non-transitory computer-readable medium of claim 12, wherein:

the non-transitory computer-readable medium is implemented on an AP; and the instructions are further executable by the processor to:

determine the AP can split antennas, and perform the DFS CAC for the second bandwidth using a dedicated antenna of the AP.

18. A method performable by an access point (AP), the method comprising:

receiving a Wi-Fi ranging request comprising a ranging request to initiate a Fine Timing Measurement (FTM) session;

responsive to receiving the Wi-Fi ranging request, determining whether a traffic load at the AP is higher than a threshold level;

responsive to determining the traffic load is higher than the threshold level, rejecting the Wi-Fi ranging request;

based on receiving a Wi-Fi ranging request and determining a second bandwidth is clear of priority traffic, modifying bandwidth of a Wireless Local Area Network (WLAN) channel on which the AP is operating from a first bandwidth to the second bandwidth to serve the Wi-Fi ranging request, wherein the second bandwidth is greater than the first bandwidth, wherein the WLAN channel is a Dynamic Frequency Selection (DFS) WLAN channel, and wherein determining the second bandwidth is clear of priority traffic comprises determining the second bandwidth is clear of radar traffic for a DFS regulation-specified time interval; and upon completed service of the Wi-Fi ranging request, restore the WLAN channel to the first bandwidth for performing non-ranging Wi-Fi operations.

19. The method of claim 18, further comprising:

prior to modifying the bandwidth of the WLAN channel, queuing non-ranging Wi-Fi traffic.

20. The method of claim 19, further comprising:

responsive to restoring the WLAN channel to the first bandwidth, reinitiating transmission of the queued non-ranging Wi-Fi traffic in the WLAN channel.

* * * * *